United States Patent [19]

Long et al.

[11] Patent Number: 4,882,785

[45] Date of Patent: Nov. 28, 1989

[54] UNDERWATER DIVER'S DRY SUIT HAVING A PERMANENTLY COMPRESSED CELLULAR LAYER

[75] Inventors: Richard W. Long; Robert T. Stinton, both of San Diego, Calif.

[73] Assignee: Diving Unlimited International, Inc., San Diego, Calif.

[21] Appl. No.: 182,384

[22] Filed: Apr. 18, 1988

Related U.S. Application Data

[60] Division of Ser. No. 694,703, Jan. 23, 1985, Pat. No. 4,778,643, which is a continuation of Ser. No. 476,472, May 25, 1983, abandoned, which is a division of Ser. No. 372,625, Apr. 28, 1982, Pat. No. 4,388,134.

[51] Int. Cl.⁴ .................. B29C 43/20; B32B 1/10; B32B 31/00; B63B 11/04
[52] U.S. Cl. .................. 2/2.1 R; 428/314.4; 428/318.4
[58] Field of Search ............. 428/304.4, 314.4, 318.4; 264/321, 510, 512, 570; 441/102, 108, 111, 116; 2/2.1 R; 156/304.3, 159

[56] References Cited

U.S. PATENT DOCUMENTS

| 3,686,064 | 8/1972 | Bonnet et al. | 428/314.4 |
| 3,714,078 | 1/1973 | Gordon et al. | 428/314.2 |
| 3,804,700 | 4/1974 | Hoey | 428/314.2 |

Primary Examiner—Jan H. Silbaugh
Assistant Examiner—Neil M. McCarthy
Attorney, Agent, or Firm—Brown, Martin, Haller & McClaim

[57] ABSTRACT

An underwater diver's dry suit having a permanently compressed cellular core material and inner and outer layers of covering material.

7 Claims, 2 Drawing Sheets

UNDERWATER DIVER'S DRY SUIT HAVING A PERMANENTLY COMPRESSED CELLULAR LAYER This is a Division of application Ser. No. 694,703, filed Jan. 23, 1985, now U.S. Pat. 9,778,643, which was a Continuation of application Ser. No. 476,472, filed May 25, 1983, now abandoned, which was a Division of application Ser. No. 372,625, filed Apr. 28, 1982, which is now U.S. Pat. No. 4,388,134.

BACKGROUND OF THE INVENTION

The invention relates to dry suits used by underwater divers.

Dry suits are generally made with a foam rubber core that is laminated on both faces with a nylon jersey knit glued to the core material. The sections of the suit are glued together and then sewn on the outside.

The cellular material of the core will compress with depth during diving, causing a change in buoyancy, so that the diver must take make buoyancy adjustments.

According to the present invention, a diver's dry suit is provided which consists of outer and inner layers of waterproof material and a middle layer of permanently collapsed cellular material disposed between the outer and inner layers, the suit having very little compression and substantially constant buoyancy with depth.

Thus, the buoyancy of the suit will not change and the diver need not make any adjustment when diving.

DETAILED DESCRIPTION OF THE DRAWINGS

Figure 1:
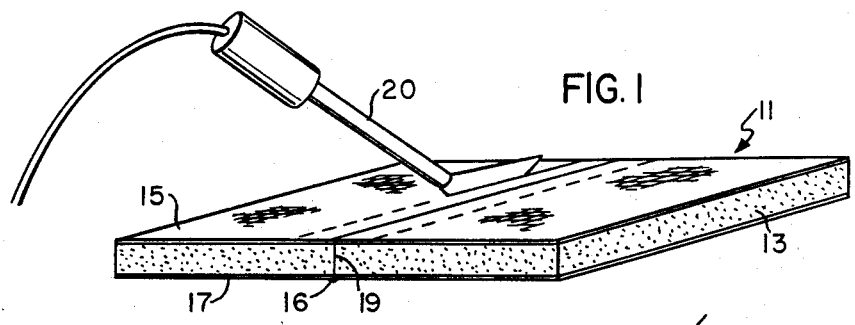
FIG. 1 is a perspective view of a section of an underwater diver's dry suit demonstrating the step of burning along a line on each side of the seam.

Referring to the drawings, a portion of dry suit for underwater divers is shown at 11. The suit includes a foam core 13 of material such as foam rubber. The faces of the core 13 are covered with layers 15 and 17 of material such as nylon jersey. The layers of nylon jersey are affixed to the core 13 with a suitable adhesive. The nylon layers are sewn to the core and to each other with blind stitches 16. This provides a generally satisfactory construction. However, after a certain amount of time, the adhesive dries and cracks and the continual putting on and taking off of the suit causes the adhesive to deteriorate in the seams and cause small pin hole leaks. Water leaks into the inside of the suit and causes the diver to become wet, cold and uncomfortable.

Figure 2:
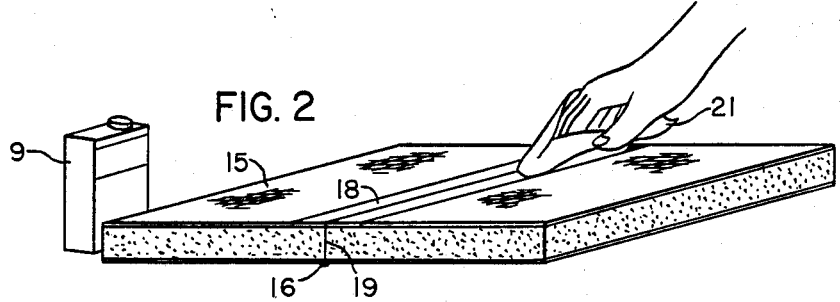
FIG. 2 shows the step of impregnating the isolated strip over the seam with a solvent such as toluene.
Figure 3:
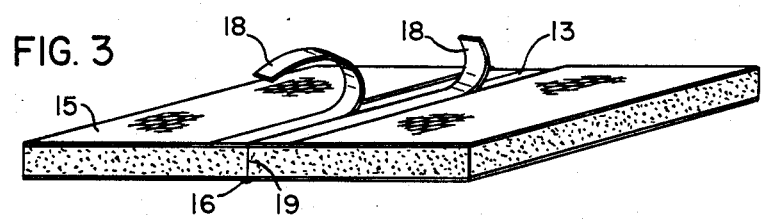
FIG. 3 demonstrated the step of removing the isolated strip from over the seam.
Figure 4:
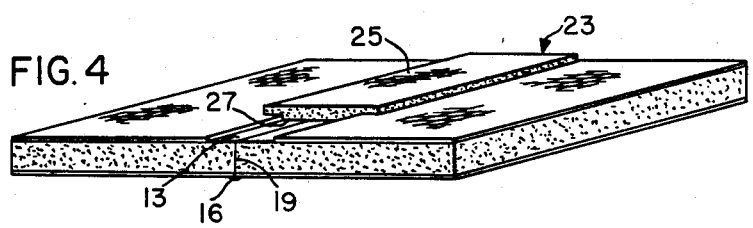
FIG. 4 shows the positioning of a sealing strip over the exposed core along the seam of the dry suit.
Figure 5:
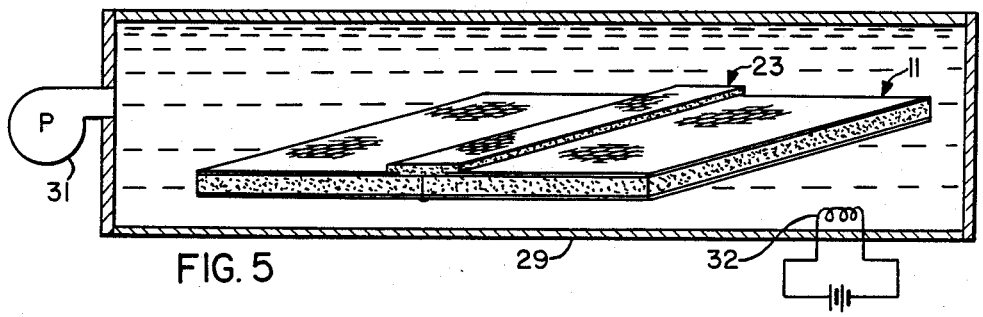
FIG. 5 demonstrates the step of compressing the dry suit and seal in heated water under pressure.
Figure 6:
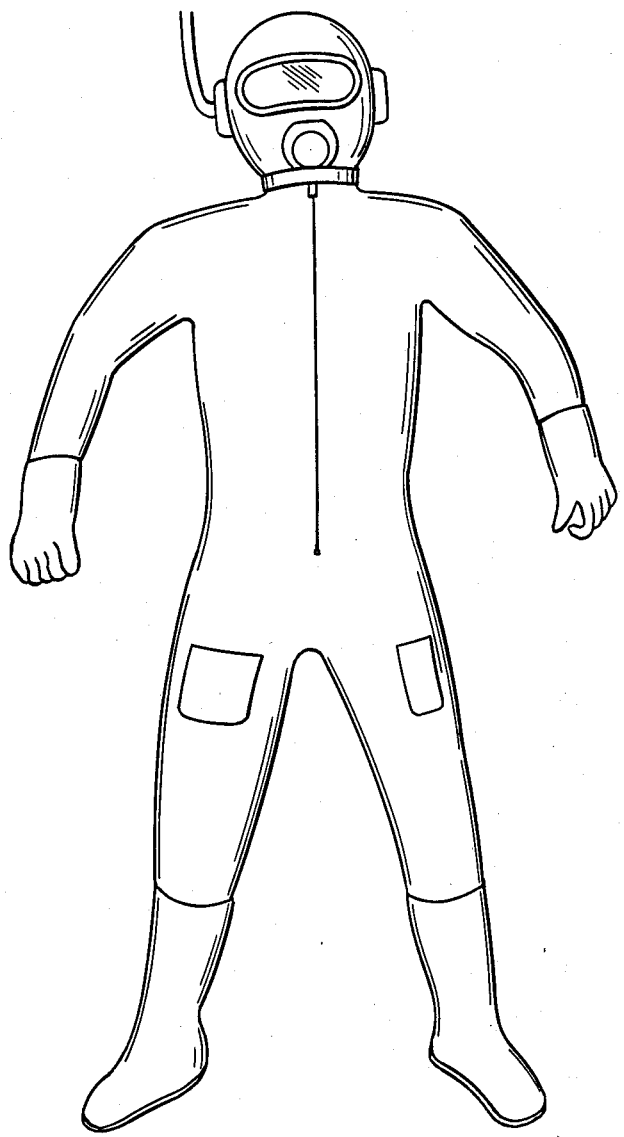
FIG. 6 illustrates a typical diver's dry suit.

Strips 18 of the nylon layer 15 are removed from along the seam 19 on the inside of the suit. One way of doing this is shown in FIG. 1 of the drawings. A heated iron 20 is run along the layer of nylon 15 on the inside of the suit on a line approximately one-quarter inch to three-eighths inch from the seam 19 of the suit sections on each side of the seam. Thus, the strips 18 of nylon are detached or isolated from the rest of the layer 15 because the nylon along the path of the iron is incinerated and destroyed. These isolated strips are still affixed to the foam core 13 by the adhesive and the next step is to release the strips 18 from the foam core 13 so that the foam core is exposed without destroying the foam core. One method of doing this is to pass a cloth 21 containing toluene from source 9 over the strips 18 as shown in FIG. 2. The fumes from the cloth 21 dissolve or weaken the adhesive. The strips 18 can now be removed as shown in FIG. 3, leaving the surface of the core 13 of foam material exposed. The nylon strips 18 are approximately three-eighths inch wide.

Next, a strip 23 composed of an outer layer 25 of material such as nylon jersey and an inner layer 27 of foam material such as closed cell foam rubber is positioned over the core surface 13 with the foam of the core surface 13 facing the foam 27 on the strip 23, and with an adhesive between the foam sections to bond them together in a foam to foam connection. The result is a strip 23 approximately three-quarters inch wide on the interior of the suit with the foam 27 of the strip 25 adhering to the foam 13 of the suit. This foam to foam contact along the seam gives a complete watertight seal.

The result is a complete seal on the inside of the suit and water cannot leak through the seam. Even if water leaks through the seam itself, the water cannot migrate between the nylon and the rubber foam because the nylon has been removed over the seam and the foam to foam contact provides a one-hundred percent seal.

This seal may be further guaranteed by a procedure which reduces the size of the bubbles in the foam. The above sealing procedure is accomplished after the sections of the suit are cut and sewn together. There are many pressure/temperature/time profiles to compress the foam. The one hereinafter discussed is the most efficient we have found to date. Within a week after the construction of the suit, the suit is placed inside a pressure chamber 29 that is filled with water. At a controlled temperature such as about 60 degrees F. to 75 degrees F. provided by heater 32, the chamber is pressurized by means such as a hydrostatic pump 31 to approximately 500 pounds per square inch pressure. The suit is left at this temperature and pressure for approximately twenty-four to forty-eight hours. As a result, the cellular material in the core of the suit collapses, reducing the size of the cellular bubbles and rendering the suit and seals much stronger. This procedure removes some of the stretch in the material and the material will not return to its original condition.

A diving suit using this technique may utilize a thin foam material, such as closed cell foam rubber, about three thirty seconds inch thick. As discussed above, this foam material has a layer of nylon type material on each face. A durable nylon layer is provided on the outside of the suit. This is preferably a canvas type material. The ability to withstand wear is increased considerably. When the suit is processed through the compression procedure, it is permanently collapsed. The material has very little compression left and it changes little in thermal conductivity or buoyancy.

Since the buoyancy of the compressed suit does not change with depth, the thermal protection and buoyancy of the garment are constant and independent of depth. The surface buoyancy and "at depth" buoyancy are virtually the same, and the diver is not required to make buoyancy adjustments. Stretch of the diving suit material is reduced and the material is stronger.

Having thus described our invention, we claim:

1. A substantially constant buoyancy, high strength dry suit for underwater divers, formed from a material comprising:
    an outer layer of waterproof material;
    an inner layer of material;
    a middle layer of permanently collapsed cellular material disposed between said outer layer and said inner layer, said cellular layer being permanently compressed such that it has very little compression and constant thermal conductivity and buoyancy with depth.

2. The dry suit according to claim 1, wherein the middle layer is of substantially uniform thickness and is continuously flexible for conforming of the body contour and movement of a diver.

3. The dry suit according to claim 1, wherein the middle layer is three thirty seconds of an inch thick.

4. The dry suit according to claim 1, wherein the middle layer is formed of closed cell cellular material.

5. The dry suit according to claim 4, wherein the cellular material is foam rubber.

6. The dry suit according to claim 1, wherein the cellular material is permanently compressed in a pressure chamber at a predetermined pressure for an extended period of time.

7. The dry suit as claimed in claim 1, comprising sections of said material stitched together along seam lines, a portion of the inner layer being removed along each seam line, and a sealing strip comprising an outer layer of material and an inner layer of permanently collapsible foam material adhesively secured along each seam line with the foam side of each sealing strip placed against the exposed foam core and forming a foam to foam seal, the foam core of the suit sections and foam material of the sealing strips being permanently compressed after construction of the suit.

* * * * *